United States Patent [19]

Foulkes et al.

[11] Patent Number: 5,318,834
[45] Date of Patent: Jun. 7, 1994

[54] POLYMERIC FILMS

[75] Inventors: Jonathan P. Foulkes, Bristol; David Williamson, Swindon, both of England

[73] Assignee: Courtaulds Films (Holdings) Limited, Bridgwater, England

[21] Appl. No.: 984,379

[22] Filed: Dec. 2, 1992

[30] Foreign Application Priority Data

Dec. 3, 1991 [GB] United Kingdom ................. 9125641

[51] Int. Cl.$^5$ ................................................ B32B 3/26
[52] U.S. Cl. .............................. 428/304.4; 428/307.3; 428/308.4; 428/349; 428/461; 428/910; 428/515
[58] Field of Search ...................... 428/349, 910, 304.4, 428/461, 307.3, 308.4, 515

[56] References Cited

U.S. PATENT DOCUMENTS

| 4,698,261 | 10/1987 | Bothe et al. | 428/204 |
| 5,091,236 | 2/1992 | Keller et al. | 428/213 |
| 5,151,317 | 9/1992 | Bothe | 428/216 |

FOREIGN PATENT DOCUMENTS

| 0221690 | 5/1987 | European Pat. Off. | C08J 7/04 |
| 228041 | 7/1987 | European Pat. Off. | |
| 0312266 | 4/1989 | European Pat. Off. | B65D 65/40 |
| 8812789.6 | 6/1986 | Fed. Rep. of Germany | B32B 7/06 |
| 3940173A1 | 6/1991 | Fed. Rep. of Germany | B32B 27/32 |
| 02859 | 4/1989 | PCT Int'l Appl. | |
| 1441178 | 6/1976 | United Kingdom | B32B 27/08 |

Primary Examiner—Edith Buffalow
Attorney, Agent, or Firm—Bacon & Thomas

[57] ABSTRACT

Biaxially oriented polymeric films consisting of a core layer of voided polypropylene with a layer of non-voided polypropylene homopolymer on one surface and a layer of a heat sealable polymer on the non-voided layer, the other surface of the core layer having at least one non-voided polymeric layer thereon. Such films have shown good puncture resistance combined with good gloss for the heat sealable polymer layer on the non-voided homopolymer layer.

10 Claims, No Drawings

POLYMERIC FILMS

This invention concerns polymeric films, especially polypropylene films, having puncture resistance. It has been proposed hitherto in Research Disclosure 226030A to impart puncture resistance to polymeric films by the inclusion of a layer consisting of a blend of polypropylene with a low density polyethylene. Although such layers impart some degree of puncture resistance, depending upon their relative thickness compared with that of the film itself, they have the disadvantage of reducing the gloss of the films.

According to the present invention there is provided a biaxially oriented polymeric film comprising a core layer of voided polymeric polypropylene homopolymer with a layer of substantially non-voided polypropylene homopolymer thereon and a layer of a heat sealable polymer on the layer of non-voided polypropylene homopolymer so that the film is heat sealable, the other surface of the voided polymeric polypropylene homopolymer core layer having at least one non-voided polymeric layer thereon.

Films of the present invention have shown good puncture resistance combined with good gloss, for example for the heat seal layer. The core layer can be voided with any of the hitherto proposed voiding agents which can be organic or inorganic. Examples of organic voiding agents which can be used include polyamides, for example nylons, and polyesters, for example polyethylene terephthalate and polybutylene terephthalate. Examples of inorganic voiding agents which can be used include chalk. The use of voiding agents with polypropylene is well known in the art, as are the amounts of voiding agents which can be used and the particle size necessary to induce voiding when orientation is effected. The amount of voiding agent will usually represent from 5 to 15 percent by weight of the core layer.

If desired, the core layer can contain other materials which do not induce voiding, for example pigments, eg titanium dioxide, and/or substances which impart surface properties to the outer surface of the films, eg slip agents. The amount of such other materials when present will usually be up to 5 percent of the core layer, and they will usually be present in an amount of at least 1 percent by weight of the core layer.

On at least one surface of the core layer of films of the present invention is a substantially non-voided layer of a polypropylene homopolymer. Such layers can include a pigment and/or substances which impart surface properties to the outer surface of the films. However, when a pigment is present, it should be present in an amount such that it should not induce voiding to anything other than a minimal degree. In order to obtain a good gloss, it is generally necessary for the non-voided polypropylene homopolymer layer not to contain other polyolefinic materials.

At least one of the outer layers of films of the present invention should be heat sealable and at least one such layer will be present on the at least one layer of substantially non-voided propylene homopolymer. The heat sealable layer or layers are preferably of a copolymer containing units derived from propylene and at least one other alpha-olefin, eg ethylene and/or but-1-ene, but other heat sealable polymer layers can be used, for example layers of polypropylene homopolymers. Copolymers of propylene with ethylene, for example containing about 4 percent of units derived from ethylene, can conveniently be used. If desired the heat seal layer or layers can include other materials, for example a pigment, eg in amounts up to 20 percent by weight of the heat seal layer.

Although it is generally preferred to have a non-voided layer of a polypropylene homopolymer and a layer of a heat sealable polymer on both surfaces of the core layer, one pair of such layers can be omitted, provided the film still possesses adequate puncture resistance. This can in general be provided by at least one non-voided polymeric layer, for example of polypropylene homopolymer, or of high or low density polyethylene, for example in admixture with polypropylene homopolymer. As will be appreciated, although this can enable the puncture resistance to be at a desired level, the gloss of the resulting layer may well be reduced compared with that of the other film surface.

Either or both outer surfaces of films of the present invention are preferably treated to improve their surface energy, e.g. by flame or corona discharge treatment, for example to improve the adhesion of the films to metal layers and/or inks and/or other coating materials, eg. other films which may be laminated thereto.

Films of the present invention can be produced by known methods, and advantageously by coextrusion of the respective layers followed by biaxial stretching. The biaxial stretching is preferably effected sequentially.

Various thicknesses of films can be produced, but they are conveniently from 30 to 60 microns thick for packaging applications. The thicknesses of the various layers can also be selected within wide limits, it generally being preferred that the core layer be from 15 to 35 microns thick. The outer, heat seal layers will generally be of a conventional thickness for heat sealing, eg from 1 to 2 microns.

The layers of polypropylene homopolymer between the core layer and the heat seal layer should be of a thickness which imparts puncture resistance to the films, especially when compared with otherwise identical films not including such homopolymer layers. Up to 5 microns thickness will generally be sufficient, although it will usually be necessary for such layers to be at least 1 micron thick.

The following Examples are given by way of illustration only.

Example 1

A five layer polymer web was produced by coextruding a core layer of a polypropylene homopolymer containing 9 percent by weight of chalk having a mean particle diameter of 5 microns and 3 percent by weight of titanium dioxide having a mean particle diameter of less than 0.2 microns, with a layer of polypropylene homopolymer on each surface and a layer of a propylene/ethylene copolymer (4 percent by weight of units derived from ethylene) on each homopolymer layer. The web was then heated by passing it over heated rollers at 120° C. and stretched 4.5 times in the direction of extrusion. Thereafter, it was stretched 10 times in the transverse direction at a temperature of 156° C. The stretched web had a core layer thickness of 30 microns, with on each surface a polypropylene homopolymer layer 5 microns thick and containing no chalk, the stretched heat seal layers each being 1 micron thick.

The film had a density of 0.66 $g/cm^3$, an optical density of 0.61 as measured by Tobias TCX Densitometer, and a gloss of 50 at 20° as measured by ASTM D523(85). The film furthermore had a stiffness of 0.82 in the machine direction, and 1.96 in the transverse direction.

The puncture resistance of the film as measured using an Instron Tensile Tester with a 1 mm probe was 0.99, and with a 3 mm probe was 5.05. This compared favourably with a three layer film produced in substantially the same manner but without the non-voided homopolymer layers which had 1 mm probe puncture resistance of 0.50 and a 3 mm probe puncture resistance of 2.00. The gloss value for this three layer film was 10 at 20° as measured by ASTM D523(85).

Example 2 (comparison)

A three-layer polymer web was produced using the technique of Example 1, the two polypropylene homopolymer layers on each surface of the core being omitted. The overall thickness of the biaxially stretched film was 40 microns, the heat seal layers each being 1.5 microns thick. The film had a puncture resistance with a 1 mm probe of 0.43 and with a 3 mm probe of 1.75 using the measuring technique referred to in Example 1.

Example 3 (comparison)

A three-layer film was produced using the techniques used in Example 2, except that one heat seal layer had a thickness of 2.5 microns. The other heat seal layer had a thickness of 1.5 microns, and the overall thickness of the film was 40 microns. In addition, an aqueous acrylic coating composition was applied to the film after stretching it in the longitudinal direction but before stretching it in the transverse direction. The acrylic coating after the film had been stretched in the transverse direction was about 1 micron thick.

The puncture resistance of the film using a 1 mm probe was 0.47 and with a 3 mm probe was 1.77 using the measuring technique referred to in Example 1.

We claim:

1. A biaxially oriented polymeric film comprising a core voided polymeric polypropylene homopolymer with a layer of pigmented substantially non-voided polypropylene homopolymer thereon and a layer of a heat sealable polymer on the layer of non-voided polypropylene homopolymer so that the film is heat sealable, the other surface of the voided polymeric polypropylene homopolymer core layer having at least one non-voided; non pigmented polymeric layer thereon; said non-voided layers being of sufficient thickness to impart puncture resistance to the film.

2. A film according to claim 1, wherein the said at least one non-voided non pigmented polymeric layer on the core layer comprises a single polymeric layer.

3. A film according to claim 1, wherein the said at least one non-voided non pigmented polymeric layer comprises a layer of a polypropylene homopolymer and a high or low density polyethylene.

4. A film according to claim 1, wherein the at least one non-voided non pigmented polymeric layer on the core layer comprises a further layer of non-voided non pigmented polypropylene homopolymer on the core layer and a layer of a heat sealable polymer on the said further layer.

5. A film according to claim 4, wherein the said further layer of non-voided non pigmented polypropylene homopolymer is of substantially the same polymer as the non-voided pigmented polypropylene homopolymer on the other surface of the core layer.

6. A film according to claim 1, wherein the core layer includes a pigment.

7. A film according to claim 1, wherein the film includes a heat sealable layer of a propylene/ethylene copolymer containing not more than 10 percent by weight of units derived from ethylene, or a layer of a propylene homopolymer.

8. A film according to claim 1, wherein at least one outer surface of the film has been treated to increase its surface energy.

9. A film according to claim 1, wherein at least one outer surface thereof has had a metal coating applied thereto.

10. A film according to claim 1, wherein at least one outer surface thereof has a layer of an acrylic polymer thereon.

* * * * *